United States Patent [19]

Amemori et al.

[11] 4,111,046
[45] Sep. 5, 1978

[54] TURBINE METERS

[75] Inventors: Hiroyuki Amemori, Kawasaki; Hideki Izumi, Tsuchiura; Katsuyuki Tanaka, Tamatsukuri, all of Japan

[73] Assignee: Tokico Ltd., Kawasaki, Japan

[21] Appl. No.: 783,019

[22] Filed: Mar. 30, 1977

[30] Foreign Application Priority Data

Apr. 2, 1976 [JP] Japan .................................. 51-37483
Sep. 27, 1976 [JP] Japan .................................. 51-115673

[51] Int. Cl.² ........................................... G01F 1/115
[52] U.S. Cl. ................................ 73/231 R; 73/272 R
[58] Field of Search ............. 73/231 R, 231 M, 272 R

[56] References Cited

U.S. PATENT DOCUMENTS

| 3,097,529 | 7/1963 | Jackson et al. | 73/231 R |
| 3,121,330 | 2/1964 | Leslie et al. | 73/231 R |

FOREIGN PATENT DOCUMENTS

| 1,235,560 | 5/1960 | France | 73/231 R |
| 1,031,098 | 5/1966 | United Kingdom | 73/231 M |
| 1,093,493 | 12/1967 | United Kingdom | 73/231 M |
| 1,131,850 | 10/1968 | United Kingdom | 73/231 M |
| 222,684 | 4/1969 | U.S.S.R. | 73/231 R |

Primary Examiner—James J. Gill
Attorney, Agent, or Firm—Haseltine, Lake & Waters

[57] ABSTRACT

A turbine meter comprising a casing of substantially hollow cylindrical shape installed within a conduit through which a fluid to be measured is flowing, an axle member supported within the casing and having an annular recess therearound; a longitudinal flow passage formed in the axle member, a plurality of discharge holes formed in the axle member to connect communicatively the annular recess and the flow passage, a supply pipe inserted into said conduit through the wall thereof and functioning to supply a pressurized fluid to said flow passage in the axle member, a vane wheel comprising a hub disposed around said annular recess with minute gaps therebetween and adapted to rotate in a substantially non-contacting state relative to the axle member and a plurality of vanes implantedly fixed at their root parts to the hub, said vane wheel being rotated by a portion of the fluid being measured which flows through the casing, and means for detecting the rotation of the vane wheel. The pressure of the pressurized fluid and the dimensions of said minute gaps are selected at values to cause forces acting on the vane wheel during rotation thereof and urging the vane wheel to undergo displacement in the thrust direction to be mutually cancelled, whereby the vane wheel rotates in a state of stable equilibrium.

6 Claims, 10 Drawing Figures

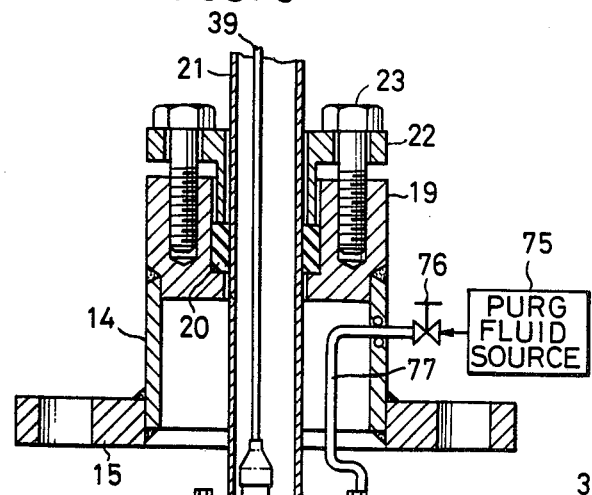
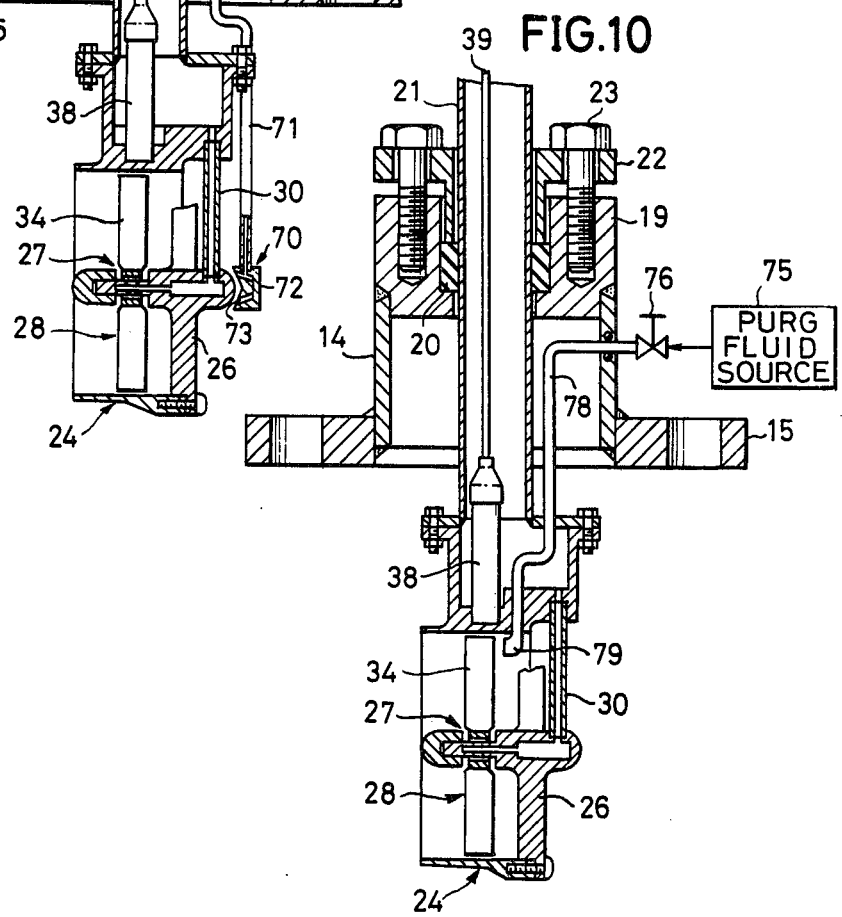

TURBINE METERS

BACKGROUND OF THE INVENTION

The present invention relates generally to turbine meters, and more particularly to improvements in a turbine meter in which a pressure-fed gas bearing is used in the shaft bearing of its vane wheel or rotor, and which is highly suitable for measurements of flow velocities or flow rates particularly of gases and the like having no lubricative property.

In general, turbine meters are used for measuring flow velocities, flow rates, and other quantities of fluids flowing in pipes and ducts of large inner diameter such as smoke stacks and flues.

In a conventional turbine meter of this type, a ball bearing or a sleeve bearing is used for the bearing supporting the shaft of the vane wheel or rotor which is rotated by the flow of a fluid.

However, while ball bearings have the advantage of relatively low rotational resistance, they have the drawback of poor durability. Particularly in cases such as that where a mechanism for supplying lubricating oil to the bearing cannot be installed because of miniaturization of the turbine meter, itself, or that where the fluid to be measured is a high-temperature or low-temperature gas and there is no suitable lubricating oil which can be used, the ball bearing rotates in an unlubricated state. For this reason, a ball bearing under such conditions have an extremely short serviceable lives.

Sleeve bearings have the advantage of better durability than ball bearings but have the disadvantage of high rotational resistance. For this reason, the measurement accuracy of a turbine meter using a sleeve bearing becomes poor in instances of measurement of gases of low density which cannot exert ample torque to the vane wheel. Furthermore, in the measurement of a gas, damage such as seizure, galling, and scoring easily occur in the sleeve bearing since the gas does not have lubricative property.

Still another problem accompanying both ball bearings and sleeve bearings, when used in a turbine meter, is that when foreign matter such as dirt, dust, and slurry are in a mixed state within the fluid being measured, these foreign substances readily infiltrate into the bearing and give rise to a variation in the rotational resistance, whereby the measurement accuracy drops, and the instrument error characteristic deteriorates. Furthermore, the friction in the bearing increases, and the serviceable life of the bearing thereby becomes short, whereby stable measurement over a long period becomes difficult.

Accordingly, for the purpose of solving the above described problems, turbine meters in which so-called pressure-fed air bearings are used for rotatably supporting the vane wheel have been developed. These known turbine meters are of so-called in-line type of a construction wherein an outer cowling or casing of the same inner diameter as the pipe line or conduit conducting the fluid to be measured is provided, and a large-diameter vane wheel for rotating within this outer casing is rotatably supported on a pressure-fed are bearing. In the case where the pipe line conducting the fluid to be measured is of large diameter, however, the structure of the pressure-fed air bearing of this in-line type turbine meter is large, whereby the quantity of air discharged therefrom and becoming mixed with the fluid being measured is not negligible and greatly impairs the accuracy of measurement.

Furthermore, in a known turbine meter of this type, it is necessary to provide through holes at two places in the wall of the outer casing respectively for piping to supply air for the pressure-fed air bearings and for a pickup for detecting the rotation of the vane wheel. As a consequence, the construction of the meter is complicated, and the work of assembling this meter is laborious.

Still another problem accompanying a known turbine meter of this type is that, in the case of measurement of a fluid containing much foreign matter such as dirt, dust, and slurry, this foreign matter adheres to parts of the meter such as the vanes of the vane wheel and the bearing and thereby gives rise to a drop in measurement accuracy.

SUMMARY OF THE INVENTION

Accordingly, it is a general object of the present invention to provide a novel and useful turbine meter in which the above described problems have been solved.

Another and specific object of the invention is to provide a miniature turbine meter having a pressure-fed fluid bearing and adapted be inserted into a pipe line or conduit conducting a fluid to be measured through the pipe wall. Since this turbine meter is of the so-called insertion type, it does not impart a great resistance to the flow of the fluid being measured. Moreover, since the quantity of the fluid discharged into the pipe line from the pressure-fed fluid bearing is very small, it has almost no deleterious effect on the accuracy of measurement of the fluid being measured.

Still another object of the invention is to provide a turbine meter in which the piping for supplying the fluid for the pressure-fed fluid bearing and the parts of the pickup for detecting the rotation of the vane wheel are integrated so that the installation of fitting means in only one place in the wall of the pipe line conducting the fluid to be measured is sufficient. The turbine meter of the invention has a simple construction and can be assembled in a simple manner.

A further object of the invention is to provide a turbine meter having a washing or purging device capable of removing foreign matter such as dust, dirt, and slurry which happen to adhere to parts of the meter such as the vane wheel, bearing, and inner wall surface of the outer casing. Since, by this provision in the turbine meter according to the invention, the above mentioned parts can be washed, the accuracy of measurement can be always maintained at a high level, and the serviceable life of the meter can be prolonged.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 9 is a side view in longitudinal section of a fourth embodiment of a turbine meter of the invention; and FIG. 10 is a side view in longitudinal section showing the essential parts of a fifth embodiment of a turbine meter of the invention.

DETAILED DESCRIPTION

Figure 1:
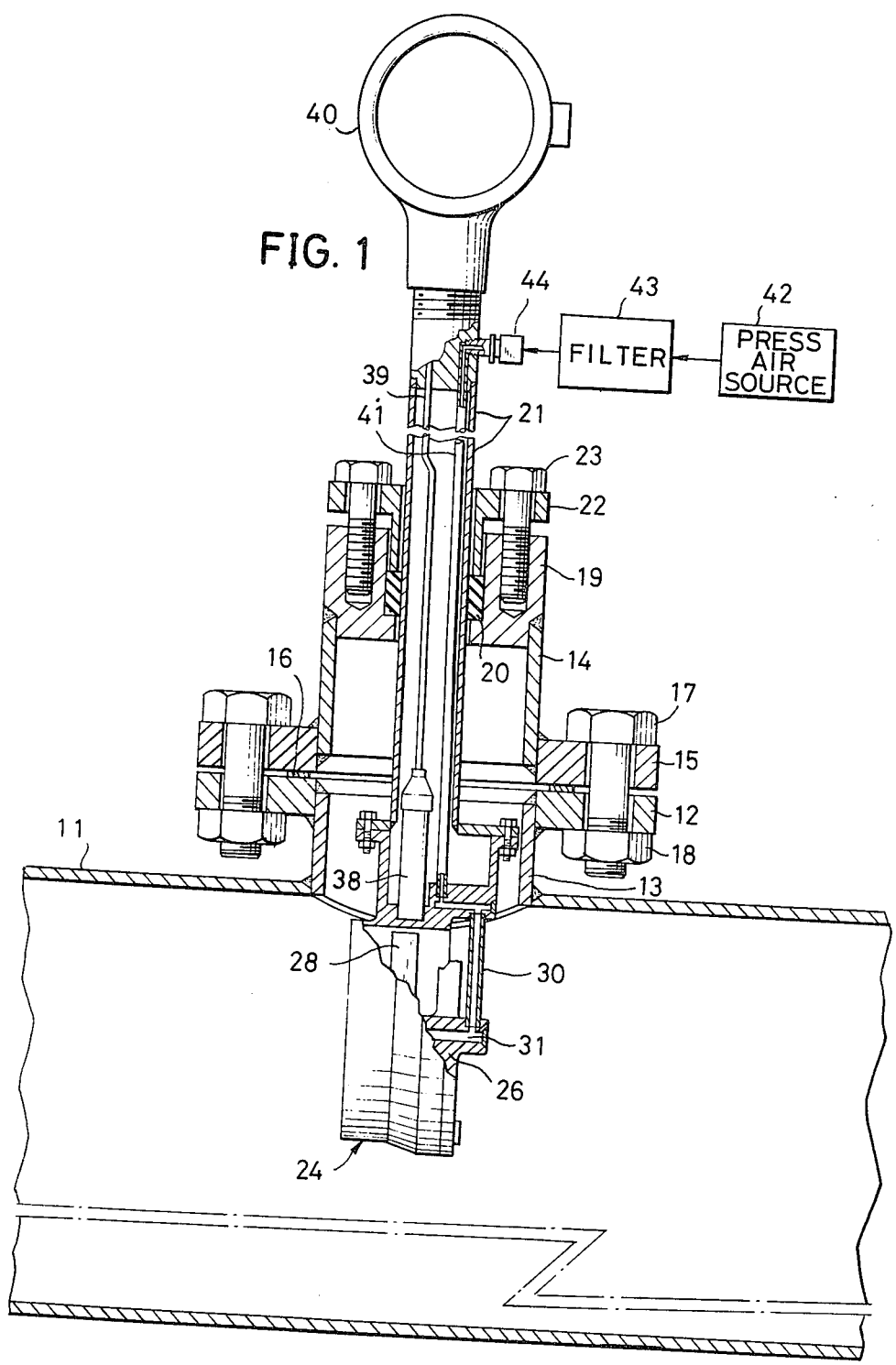
FIG. 1 is a side view, with parts cut away and parts shown in longitudinal section, showing a first embodiment of a turbine meter according to the present invention in installed state.
Figure 2:
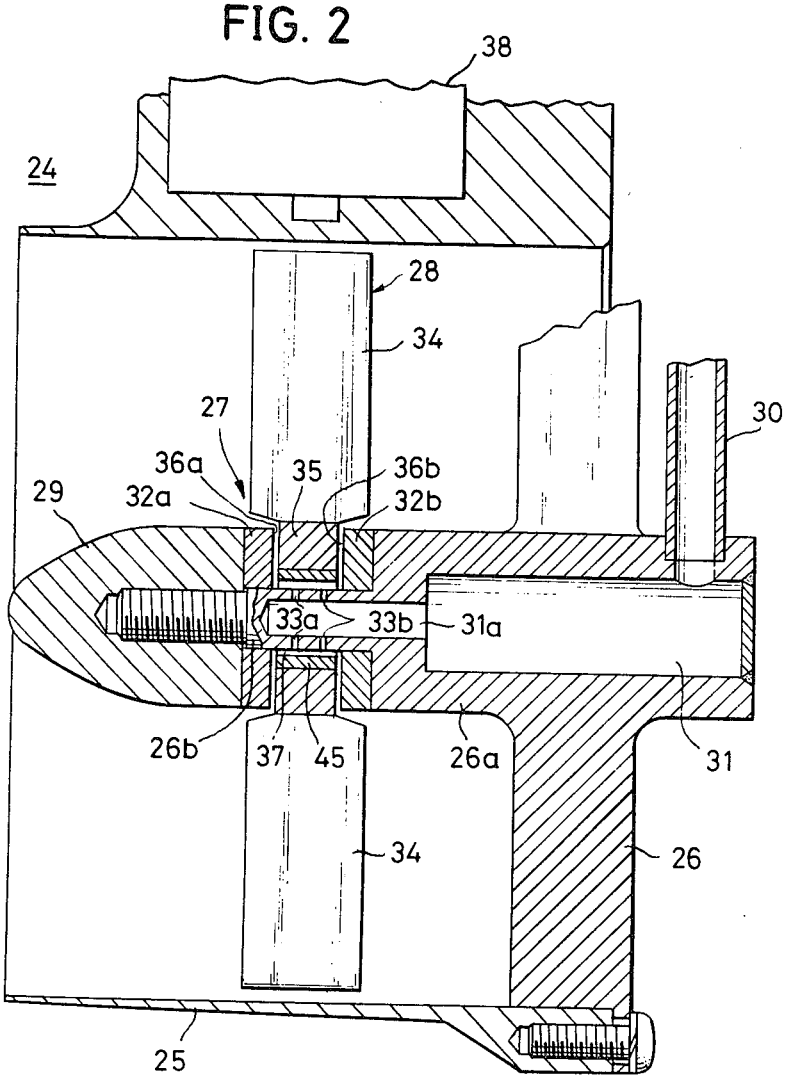
FIG. 2 is a relatively enlarged side view in longitudinal section of the vane wheel and related parts of the same turbine meter.

Referring first to FIGS. 1 and 2, a first embodiment of the invention will be described. This turbine meter is installed on a pipe line 11 of large inner diameter through which a fluid to be measured is flowing from left to right as viewed in the figures. While the fluid to be measured is smoke (air) in the case where the pipe 11 is a smoke flue, for example, the turbine meter of the invention is applicable also to measurements of other gases and fluids. A hole is drilled in one position in the wall of the pipe 11, and a tubular projecting fitting 13 having a flange 12 fixed to its outer end is secured at its base end by a method such as welding to the pipe 11 at the rim of the hole. A flange 15 fixed to the base end of a support cylinder 14 is secured by bolts 17 and nuts 18 to the flange 12 over a packing 16 interposed therebetween, the connection between the flanges 15 and 12 thereby being gas and liquid tight.

A boss 19 fixed coaxially to the outer end of the support cylinder 14 has a central through-hole through which a cylindrical turbine meter support structure 21 is inserted. A packing 20 is interposed between the boss 19 and the support structure 21 for a gas and liquid-tight fit therebetween and is held at the bottom of a counterbored hole in the boss 19 by a packing retainer 22. The support structure 21 is passed also through this packing retainer 22, which is forced toward the boss 19, and therefore against the packing 20, by bolts 23. A turbine assembly 24 is mounted on the lower end (or inner end) of the support structure 21 and projects downward from the lower end of the above described fitting 13 into the interior of the pipe 11.

The turbine assembly 24 comprises essentially an outer casing 25, support arms 26 fixed to the casing 25, a projecting arbor 26a formed integrally with the support arms 26 and thus supported coaxially within the casing 25, a small-diameter axle part 26b formed at the front (or upstream) end of the arbor 26a, an annular recess 27 being formed around the axle part 26b, a vane wheel 28 rotatably supported on the axle part 26b in the recess 27, and a nose cone 29 secured to the front end of the axle part 26b. In this turbine assembly, a pressure-fed fluid bearing is formed between the hub 35 of vane wheel 28 and the annular recess 27 of the axle part 26b.

A gas passage 31 communicating with the downstream end of a gas supply pipe 30 described hereinafter is formed centrally through the arbor 26a and communicates at its front end with a gas passage 31a formed centrally through the axle part 26b. A pair of annular thrust bearings 32a and 32b are fixed coaxially to the axle part 26b with a specific spacing therebetween at positions on the front and rear sides of the hub 35 of the vane wheel 28. A plurality of gas discharge holes 33a and 33b of small diameter communicating with the gas passage 31a are formed in and through the axle part 26b to the annular recess 27 at positions between the opposed inner faces of the thrust bearings 32a and 32b. These discharge holes 33a and 33b lie in respective spaced-apart parallel circles around the axis of the axle part 26b and are respectively spaced at equal angular intervals around their respective circles.

The vane wheel 28 comprises the above mentioned hub 35 of an inner bore diameter slightly greater than the outer diameter of the axle part 26b and a front-to-rear axial dimension slightly less than the spacing between the opposed inner faces of the thrust bearings 32a and 32b and a plurality of blades or vanes 34 made of a magnetic material and fixed to the hub 35 at angularly equally spaced positions therearound. Depending on the necessity, a bush 45 is provided to form the inner surface of the hub 35. By this construction, thin annular gaps 36a and 36b for discharging gas are formed respectively between the hub 35 and the bush 45 and the thrust bearings 32a and 32b, and a thin cylindrical space 37 for discharging gas is formed between the bush 45 and the axle part 26b.

In a position to confront the outer tips of the vanes 34 of the vane wheel 28, a pickup coil 38 is mounted on and partly embedded in the upper part of the casing 25. This pickup coil 38 is connected through conductor wires 39 extending through the interior of the support structure 21 to a preamplifier within an electric circuit container 40. The pickup coil 38 may be in the form of an electromagnetic pickup coil generating induced electromotive force in response to the rotation of the vane wheel 28, or it may be of the form of a high-frequency oscillation coil. In the latter case, a high-frequency signal modulated in response to the rotation of the vane wheel 28 is derived from the high-frequency oscillation coil and is detected, amplified, and shaped in the circuit system, whereby a pulse signal responsive to the rotational velocity of the vane wheel 28 is obtained and counted.

The aforementioned gas supply pipe 30 communicates at its other end with the downstream end of a gas supply pipe 41 extending through the interior of the support structure 21. The gas supply pipe 41 is supplied from the outside with pressurized air from a pressurized air source 42 through a filter 43 and a pressure-reducing valve 44.

In the turbine meter of the above described construction, pressurized air from the pressurized air source 42 is cleaned in the filter 43 and regulated in the pressure-reducing valve 44 to a suitable pressure higher than the pressure of the fluid being measured and is thereafter supplied through the gas supply pipe 41. The pressurized air thus supplied through the gas supply pipe 41 passes through the supply pipe 30, the passages 31 and 31a and is ejected through the discharge holes 33a and 33b into the discharge space 37. The air thus discharged passes through the space 37 and the discharge gaps 36a and 36b and is discharged out of the annular recess 27. In the design and operation of this turbine meter, the delivery pressure of the pressurized air source 42, the preset pressure of the pressure-reducing valve 44, the inner diameter and other dimensions of the bush 45, the dimensions of the hub 35, the bore diameter and number of the discharge holes 33a and 33b, the dimensions of the discharge gaps 36a, 36b, and 37, and other pertinent quantities are so determined that the resulting buoyant force due to the discharge air force in the annular recess 27 which serves to support the vane wheel 28 will be amply greater than the weight of the vane wheel 28.

When a fluid to be measured is not flowing through the pipe 11, the vane wheel 28 is not subjected to a thrust in its axial direction. For this reason, the pressurized air discharged into the discharge space 37 is discharged evenly in equal quantity through the gaps 36a and 36b. As a consequence, the vane wheel 28 is maintained in a state of equilibrium at a position such that the discharge gaps 36a and 36b are equal.

Then, when a fluid to be measured flows through the pipe 11 from the left to the right as viewed in the figures, the fluid being measures flows also into the interior of the casing 25, and the vane wheel 28 rotates at a rotational velocity responsive to the flow velocity of the fluid. At the same time, the vane wheel 28 is subjected to a force acting toward the right as viewed in the figures and is thereby urged to undergo rightward displacement on and relative to the axle part 26b. As a consequence the discharge gap 36a tends to become greater while the discharge gap 36b tends to become smaller. However, although the vane wheel 28 is urged by the rightward force to undergo displacement, the discharge pressure increases as the gap on that side decreased, whereby the reactionary force increases. As a net result, the vane wheel 28 attains a state of equilibrium at a position in the space between the thrust bearings 32a and 32b such that the discharge gaps 36a and 36b are substantially equal and rotates stably in this position.

Consequently, the vane wheel 28 rotates in a state wherein its bush 45 is not contacting any of the surfaces of the axle part 26b and the thrust bearings 32a and 32b, that is, it rotates in a "floating" state. Therefore, the resistance to rotation of the vane wheel 28 is very low, and the vane wheel rotates accurately in comformance with the flow of the fluid being measured.

Figure 3:
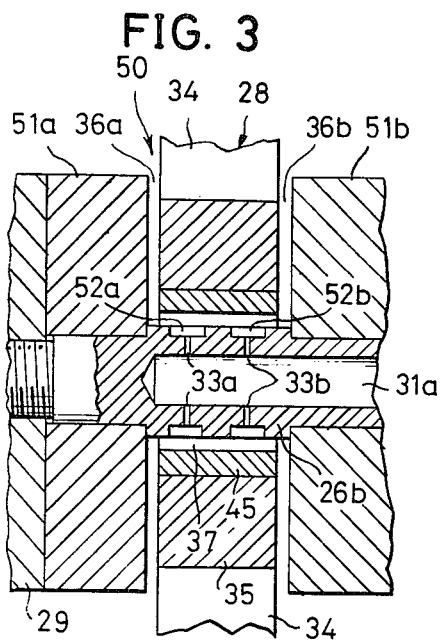
FIG. 3 is a further enlarged side view in longitudinal section showing a modified construction of the pressure-fed fluid bearing.
Figure 4:
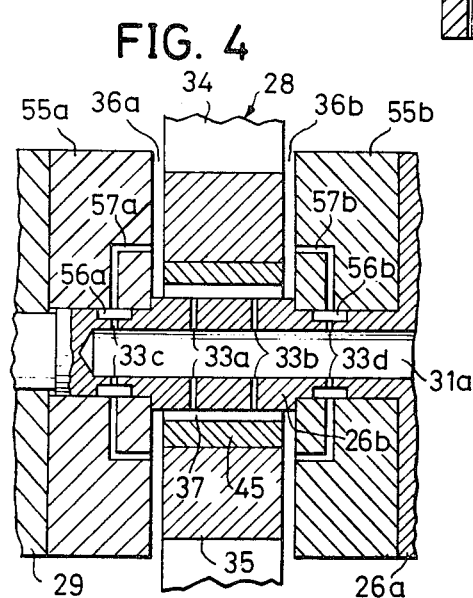
FIG. 4 is a view similar to FIG. 3 showing another modified construction of the pressure-fed fluid bearing.

Modified examples of the pressure-fed air bearing for journalling the vane wheel 28 will now be described in conjunction with FIGS. 3 and 4. In FIGS. 3 and 4, those parts which are the same as corresponding parts in FIG. 2 are designated by like reference numerals, but description of such parts will be omitted. In the modification illustrated in FIG. 3, the air discharge gaps 36a and 36b of an annular recess 50 are formed between the combination of the hub 35 and the bush 45 and a nose cone 51a and an arbor 51b. Thrust bearings are not provided as in the above described embodiment of the invention. Pocket-like recesses 52a and 52b communicating with the discharge holes 33a and 33b are formed in the outer cylindrical surface of the axle part 26b. The operation of this pressure-fed air bearing is similar to that described above in connection with the preceding embodiment of the invention.

In the other modification illustrated in FIG. 4, air discharge holes 33c and 33d and pocket-like recesses 56a and 56b are formed in the axle part 26b at positions corresponding to thrust bearings 55a and 55b. Additional discharge holes 57a and 57b respectively communicating with the recesses 56a and 56b and having openings at their other ends which respectively face the front and rear faces of the hub 35 are formed in the thrust bearings 55a and 55b. The air supplied under pressure into the passage 31a is discharged through the discharge holes 33a and 33b into the space 37 and, at the same time, is discharged through the discharge holes 33c, 33d, 57a, and 57b into the discharge gaps 36a and 36b. The pressurized air discharged through the discharge holes 57a and 57b acts to prevent even more positively the displacement in the axial direction (thrust direction) of the vane wheel 28.

Figure 5:
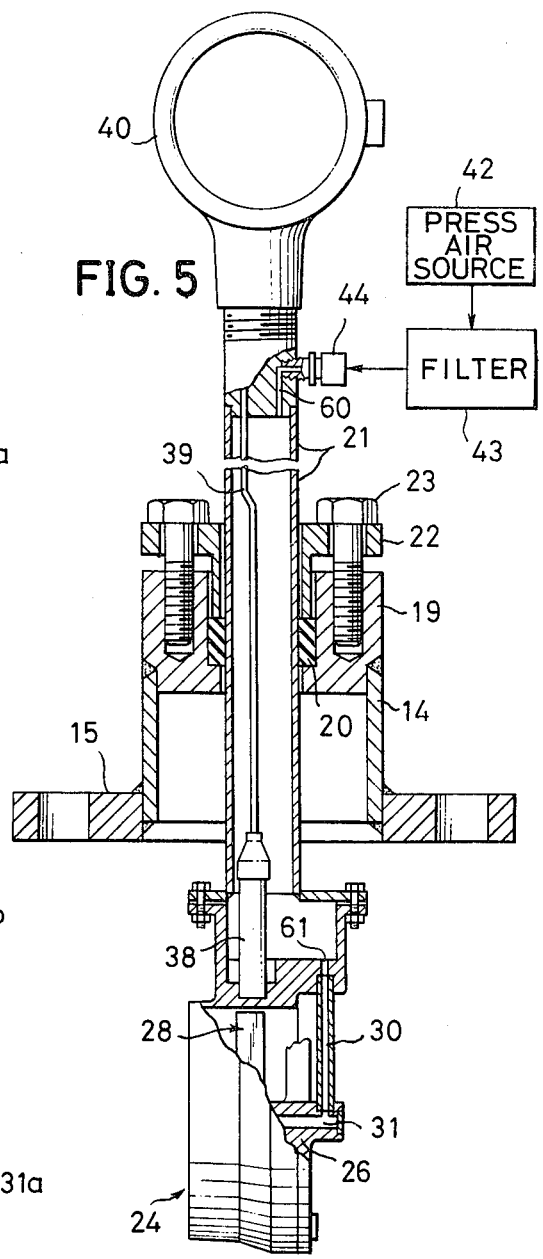
FIG. 5 is a side view, with parts cut away and parts shown in longitudinal section, showing a second embodiment of a turbine meter of the invention.

A second embodiment of the invention will now be described with reference to FIG. 5. In FIG. 5, those parts which are the same as corresponding parts in FIG. 1 are designated by like reference numerals but will not be described in detail again. In this turbine meter, the gas supply pipe 41 used in the first embodiment of the invention is omitted. Instead, the pressurized air which has passed through the pressure-reducing valve 44 is passed through a passage 60 and then supplied into the space within the support structure 21. The pressurized air thus supplied into the interior of the support structure 21 then passes through a passage 61 and is supplied into the supply pipe 30. The construction and operation of the turbine assembly 24 are the same as those of the preceding first embodiment of the invention. The construction of the instant turbine meter is relatively simple since the supply pipe 41 of the embodiment shown in FIG. 1 is not required.

Figure 6:
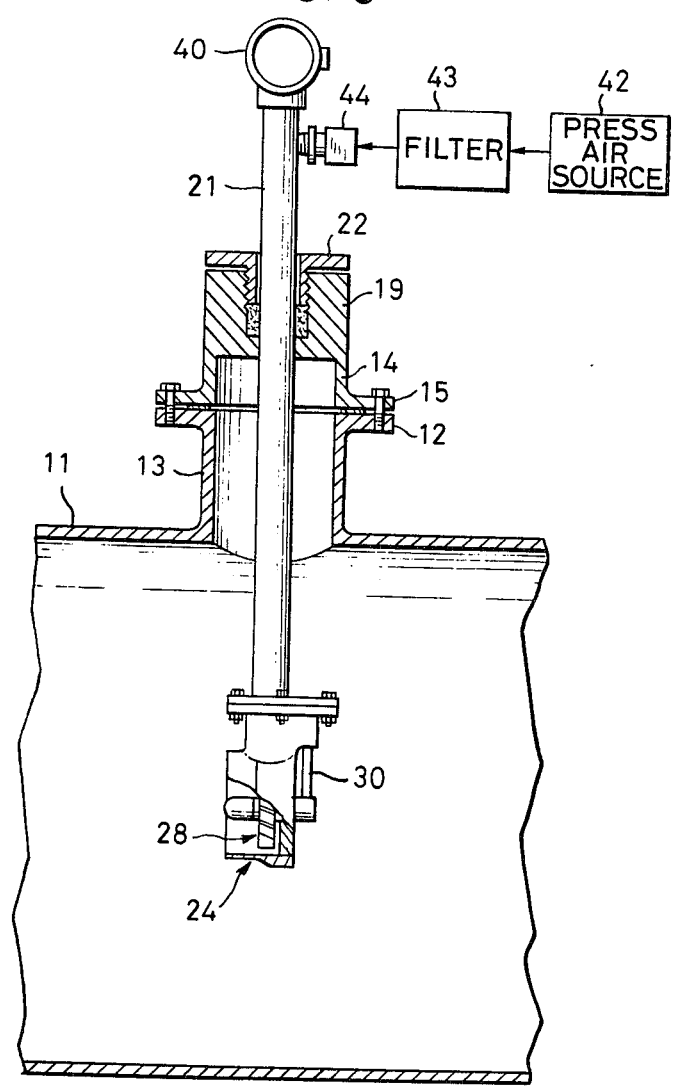
FIG. 6 is a side view, with a part in longitudinal section, showing another mode of use of the turbine meter of the invention.

In the embodiments of the invention described in the foregoing disclosure and described hereinafter, the turbine assembly 24 is adapted and mounted to carry out measurement in a position in the vicinity of the wall of the pipe 11 conducting the fluid to be measured. The operation of the turbine meter, however, is not limited to such measurement. For example, in cases such as that of measureing flow velocity distribution, the turbine assembly 24 may be disposed at any position within the interior of the pipe 11 as indicated in FIG. 6. In this case, the lower part of the support structure 21 may be fixedly held by the boss 19 and the packing retainer 22 in a state of insertion in the pipe 11.

Figure 7:
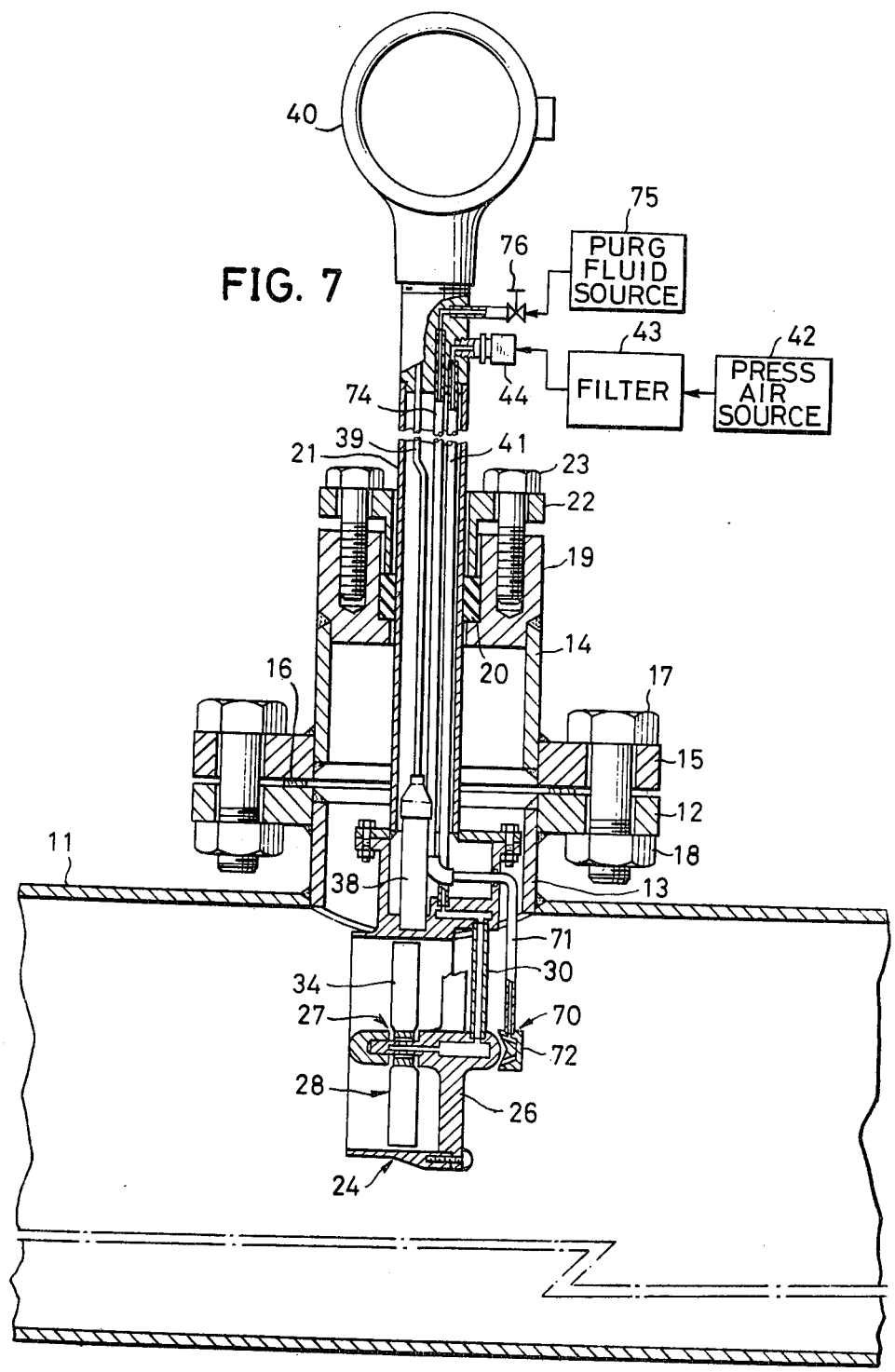
FIG. 7 is a side view, with parts cut away and parts in longitudinal section, showing a third embodiment of a turbine meter of the invention.
Figure 8:
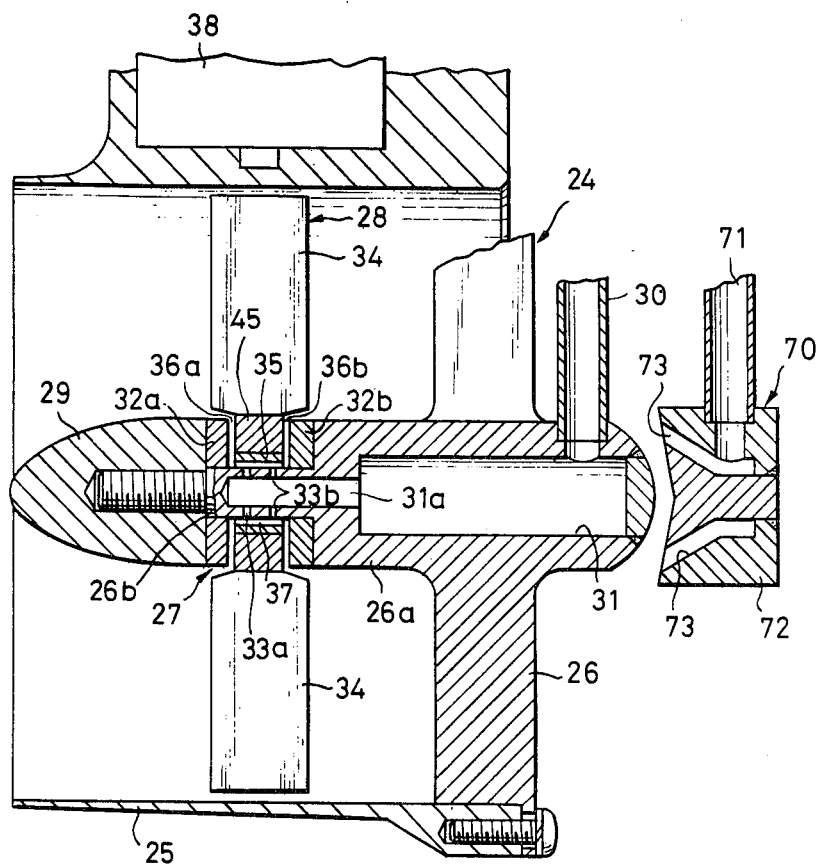
FIG. 8 is an enlarged side view in longitudinal section of the vane wheel and related parts of the turbine meter shown in FIG. 7.

A third embodiment of a turbine meter of the invention will be described with reference to FIGS. 7 and 8. In FIGS. 7 and 8, those parts which are the same as corresponding parts in FIGS. 1 and 2 are designated by like reference numerals, and description of these parts will be omitted.

In the case where the fluid to be measured contains a tacky substance such as oil mist or a tar content, this tacky substance is deposited cummulatively on parts such as the inner wall surface of the casing 25, the walls of the annular recess, and parts of the vane wheel during a long period of use of the turbine meter. In this case, the resistance to rotation of the vane wheel becomes high, whereby accurate measurement can no longer be carried out, and in case of severe contamination, it may become impossible for the vane wheel to rotate.

Accordingly, one measure which may be considered as being feasible is to provide means such as a strainer or an oil separator in the pipe line of the fluid to be measured at a point upstream from the turbine meter. However, in the case where the fluid to be measured is a mined natural gas, a large quantity of particulate dust is contained within the gas. For this reason, the strainer soon becomes clogged. The same applies to the case where the fluid to be measured is a smoke (exhaust gases) containing a large quantity of dust passing through a smoke stack or flue.

The instant embodiment of the invention provides a turbine meter which is capable of preventing cumulative deposition of tacky substances and of accomplishing accurate measurements without impairment of its instrument error characteristic even under conditions where a strainer or oil separator cannot be used. This special feature of this turbine meter is afforded by a purging or washing device of the construction and operation described below.

This purging device 70, at is part in the vicinity of the turbine assembly 24 in the pipe 11, comprises a supply pipe 71 extending downward from the base part of the fitting 13 into the pipe 11 and a purging nozzle 72 supported on and communicating with the lower end of the supply pipe 71. The nozzle 72 is so positioned that is divergently directed nozzle orifice 73 is positioned in the vicinity and to the rear of the rearwardly extending end of the arbor 26a of the turbine assembly 24, the orifice 73 being coaxially alined with the centerline of the arbor 26a. The supply pipe 71 communicates at its upper end with the lower end of a supply pipe 74 extending through the interior of the support structure 21. The supply pipe 74 is supplied with a washing or purging fluid from an outside purging fluid supply source 75 through a pipe line having a shut-off valve 76.

When necessary, the shut-off valve 76 is opened, whereupon the purging fluid from the supply source 75 is supplied through the supply pipe 74 and further through the supply pipe 71 to be ejected through the nozzle orifice 73 of the nozzle 72 toward the turbine assembly 24. As a result, foreign matter such as dust, dirt, and tacky substances adhering to parts of the turbine assembly such as the inner wall surface of the casing 25, the annular recess 27, and the vane wheel 28 are washed away by the purging fluid and thus removed.

For the purging fluid, compressed air can be used in some cases. In cases where the adhering substance is a tar, a liquid such as a solvent, warm water, or soap solution is used. In the case where the fluid to be measured is a natural gas, clean natural gas of the same kind or steam is used. The shut-off valve 76 may be of the manually operable type, or it may be connected to control means such as a timer or a metering counter thereby to be opened and closed automatically at constant time intervals or at intervals of constant flow quantity.

The purging device 70 may be applied to the turbine meter of the embodiment of the invention illustrated in FIG. 5. In this case, as shown in FIG. 9, a supply pipe 77 may be passed through the wall of the support cylinder 14 and connected at its upstream end to the shut-off valve 76 and at its downstream end to the supply pipe 71.

In the modification shown in FIG. 10, a supply pipe 78 connected at its upstream end to the shut-off valve 76 extends through the wall of the support cylinder 14 and downward through the interior thereof to a nozzle 79 at its downstream end. The nozzle 79 is disposed inside of the casing 25 near the inner wall surface thereof and in the vicinity of and to the rear of tip circle of the vanes 34 of the vane wheel 28 and has a nozzle orifice facing upstream relative to the flow of the fluid to be measured. By this arrangement of the instant purging device, the foreign matter adhering to parts such as the inner wall surface of the casing 25 and the vanes 34 can be removed even more positively.

As a modification, the nozzle 79 may be positioned in front of the vanes 34 with its orifice facing in the downstream direction. As another modification, a pair of nozzles with mutually facing orifices may be installed respectively at the front of and at the rear of the vanes 34.

The turbine meter according to the present invention is not limited in application to measurements of gases but can be effectively applied also to measurements of liquids and various other fluids. Furthermore, pressurized liquids may be used instead of compressed air in the pressure-fed bearing. If the same gas or liquid as the fluid being measured can be used in the pressure-fed bearing, this will be preferable. In addition, the pressure-fed bearing may take any of various forms other than the inherent orifice type and the pocket orifice type used in the various embodiments of the invention described above, one example being a porous sleeve type.

Further, this invention is not limited to these embodiments but various variations and modifications may be made without departing from the scope and spirit of the invention.

What is claimed is:

1. A turbine meter comprising:
    a casing of substantially hollow cylindrical shape installed within a conduit through which a fluid to be measured is flowing, said casing having an outer diameter less than the minimum cross sectional dimension of the conduit;
    an axle member supported by a support member within the casing and having an annular recess therearound;
    a longitudinal flow passage formed in the axle member;
    a plurality of discharge holes formed in the axle member to connect communicatively the annular recess and the flow passage;
    a first supply pipe inserted into said conduit through the wall thereof and functioning to supply a pressurized fluid from a pressurized fluid source disposed outside of the conduit to said flow passage in the axle member;
    a vane wheel comprising a hub disposed around the axle member and within said annular recess with minute gaps therebetween and adapted to rotate in a substantially non-contacting state relative to the axle member and a plurality of vanes implantedly fixed at their root parts to the hub, said vane wheel being rotated by a portion of the fluid being measured and flowing through the casing;
    means for detecting the rotation of the vane wheel;
    a nozzle having at least one nozzle orifice disposed in the vicinity of the axle member and vane wheel; and
    a second supply pipe installed to extend through the wall of said conduit and functioning to supply a purging fluid to said nozzle, said nozzle purging the purging fluid through the nozzle orifice supplied from the second supply pipe towards the axle member and the vane wheel.

2. A turbine meter as claimed in claim 1 further having a support structure of hollow cylindrical shape installed to extend in a gas-tight and liquid-tight state through the wall of said conduit and supporting the casing at its end thus extending into the conduit and electrical conductors connected to the detecting means and extending through the interior of the support structure, said first supply pipe also extending through the interior of the support structure.

3. A turbine meter as claimed in claim 1 in which said discharge holes open communicatively into the bottoms of pocketlike recesses formed in the periphery of said annular recess.

4. A turbine meter as claimed in claim 1 further having discharge holes communicating with said flow passage and having openings in opposed walls of said annular recess in the axle member at positions facing the upstream and downstream end faces of the hub of the vane wheel.

5. A turbine meter as claimed in claim 1, including further support means fixed to the casing for supporting the axle member, said nozzle being disposed so that the nozzle orifice confronts a center portion of the rear part of the support means.

6. A turbine meter as claimed in claim 1, wherein said nozzle is disposed in the vicinity of the inner surface of the casing so that the nozzle orifice confronts the vanes of the vane wheel.

* * * * *

UNITED STATES PATENT AND TRADEMARK OFFICE
CERTIFICATE OF CORRECTION

PATENT NO. : 4,111,046

DATED : September 5, 1978

INVENTOR(S) : AMEMORI ET AL

It is certified that error appears in the above-identified patent and that said Letters Patent are hereby corrected as shown below:

Add the following inventors' names to the Letters Patent:

--MASAHISA SEGA, SHIGEO SUGIYAMA AND SHIGETOSHI NARAMURA--

Signed and Sealed this

Fifteenth Day of May 1979

[SEAL]

Attest:

RUTH C. MASON
Attesting Officer

DONALD W. BANNER
Commissioner of Patents and Trademarks